(No Model.)
T. W. PORTER.
TAPERED AND POINTED NAIL.
No. 464,144. Patented Dec. 1, 1891.
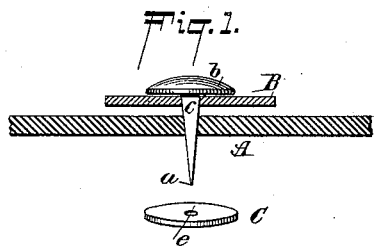
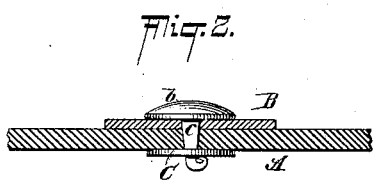
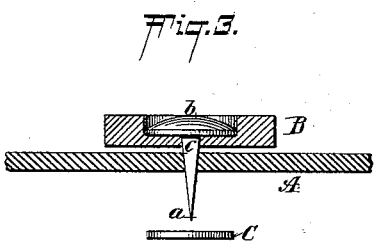
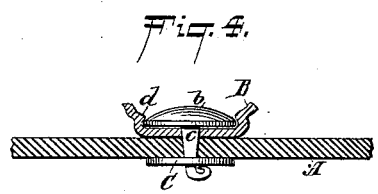
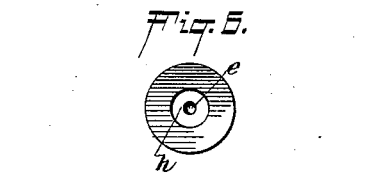
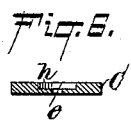
WITNESSES:
William Goebel.
Irving G. Platt
INVENTOR
Thomas W. Porter,
BY George Cook.
ATTORNEY.

UNITED STATES PATENT OFFICE.

THOMAS W. PORTER, OF MONTCLAIR, NEW JERSEY, ASSIGNOR TO THE PATENT BUTTON COMPANY, OF WATERBURY, CONNECTICUT.

TAPERED AND POINTED NAIL.

SPECIFICATION forming part of Letters Patent No. 464,144, dated December 1, 1891.

Application filed May 14, 1891. Serial No. 392,666. (No model.)

*To all whom it may concern:*

Be it known that I, THOMAS W. PORTER, a citizen of the United States, and a resident of Montclair, in the county of Essex and State of New Jersey, have invented certain new and useful Improvements in Tapered and Pointed Nails, of which the following is a specification.

My invention relates to an improvement in tapered and pointed nails, the object being to provide an article of this character which shall, by presenting a larger or more extended bearing or holding surface, be stronger and more serviceable than has heretofore been the case; and I accomplish this purpose by providing two disks or washers having openings therein of different sizes to allow of the same to fit the tapering shank of the nail at two different points, one above the article through which the nail passes and the other below it.

To more fully describe my invention, reference is hereinafter made to the accompanying drawings, in which—

Figure 1 is a view in section of my improved nail. Fig. 2 is a similar view showing the parts attached and the nail upset. Figs. 3 and 4 are modifications of the upper disk or plate. Figs. 5 and 6 are plan and sectional views, respectively, showing the lower disk or washer recessed to contain the upset end of the nail.

A represents a nail or tack made of metal, the shank or body of which is preferably made tapering, one end *a* thereof, if desired, being pointed for the purpose of enabling the nail to pierce its own way through soft material. If used upon metal, the point *a* may of course be omitted. At the opposite end of the tapering shank is formed a head or flange *b*.

B represents a metal disk, washer, or other device provided with an opening *c*, through which the nail passes and of a size large enough to permit the disk to bear against the under side of the head or flange *b*, the under side of the disk itself resting or bearing on the material through which the nail is passed. If desired, the plate or disk may be slightly hollowed out, as shown in Fig. 3, allowing the head or flange of the nail to set down therein. Again, if the washer should take the shape of a button or other article, as shown in Fig. 4, it may be locked therein by means of a shoulder *d* or otherwise.

C represents a disk or washer or other device adapted to bear on the under side of the material, and is provided with an opening *e* smaller than that in the disk B, but larger than the piercing end of the nail. The nail having been forced through the material, this disk is placed on the shank of said nail and the piercing end of the latter curled or bent over upon itself in contradistinction to being swaged or upset, the effect being to tightly bind the material between the disks B and C, as shown in Figs. 2 and 4.

If found desirable, the under side of the disk or washer C may be recessed, as shown at *h* in Figs. 5 and 6, to contain the curled or bent end of the nail and present a smooth and finished appearance to the outer side of the disk when received in position.

Having fully described my invention, what I claim as new, and desire to secure by Letters Patent, is—

1. The combination, with a nail provided at one end with a flange or head, of a disk, washer, or other article fitting on the shank of said nail and against said head or flange, and a second disk or washer fitting on said shank and near its opposite end, substantially as set forth.

2. The combination, with a nail the shank of which is tapered and headed or flanged at one end, of a disk or other article fitting on said shank and against said head, and a disk or washer fitting on said shank near its piercing end, substantially as set forth.

3. The combination, with a tapering nail provided on one end with a head or flange, of a disk or other article having an opening therein of such size as to permit the same to fit on said nail and against said head, and a disk or washer having an opening therein of a size larger than the piercing end and smaller than the flanged end of said nail, substantially as set forth.

4. The combination, with a disk, button, or other article, of a nail headed or flanged on one end and having its opposite or pointed end bent or curled upon itself, and a disk or washer fitting upon said nail and against said bent or curled end, substantially as set forth.

Signed at New York, in the county of New York and State of New York, this 5th day of May, A. D. 1891.

THOMAS W. PORTER.

Witnesses:
 IRVING G. PLATT,
 WILLIAM GOEBEL.